US012640476B2

(12) United States Patent
Liu et al.

(10) Patent No.: US 12,640,476 B2
(45) Date of Patent: May 26, 2026

(54) RADIATING ELEMENTS HAVING SINGLE OR PARALLEL PRINTED CIRCUIT BOARD-BASED FEED STALKS AND BASE STATION ANTENNAS HAVING SUCH RADIATING ELEMENTS

(71) Applicant: Outdoor Wireless Networks LLC, Claremont, NC (US)

(72) Inventors: Jian Liu, Jiangsu (CN); Jiajia Ni, Jiangsu (CN); Jian Zhang, Jiangsu (CN); Yuemin Li, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/250,556

(22) PCT Filed: Jul. 11, 2022

(86) PCT No.: PCT/CN2022/104848
§ 371 (c)(1),
(2) Date: Apr. 26, 2023

(87) PCT Pub. No.: WO2024/011344
PCT Pub. Date: Jan. 18, 2024

(65) Prior Publication Data

US 2025/0141102 A1 May 1, 2025

(51) Int. Cl.
*H01Q 5/28* (2015.01)
*H01Q 1/24* (2006.01)
(Continued)

(52) U.S. Cl.
CPC ............... *H01Q 5/28* (2015.01); *H01Q 1/246* (2013.01); *H01Q 9/44* (2013.01); *H01Q 21/26* (2013.01); *H01Q 1/48* (2013.01)

(58) Field of Classification Search
CPC ............ H01Q 5/28; H01Q 1/246; H01Q 9/44; H01Q 1/48; H01Q 21/062; H01Q 9/06;
(Continued)

(56) References Cited

U.S. PATENT DOCUMENTS

2021/0305717 A1 9/2021 Hou et al.
2021/0305718 A1* 9/2021 Li ........................... H01Q 5/48
(Continued)

FOREIGN PATENT DOCUMENTS

CN 113889747 A * 1/2022
CN 115483543 A 12/2022
WO 2023117097 A1 6/2023

OTHER PUBLICATIONS

International Search Report and the Written Opinion of the International Searching Authority corresponding to International Patent Application No. PCT/CN2022/104848 (10 pages) (mailed Dec. 20, 2022).

*Primary Examiner* — Dameon E Levi
*Assistant Examiner* — Yonchan J Kim
(74) *Attorney, Agent, or Firm* — Myers Bigel, P.A.

(57) ABSTRACT

Antennas having single or parallel printed circuit board-based feed stalks and base station antennas having such radiating elements. The single feed stalk can have two feed lines configured to feed radio frequency signals to respective dipole radiators. Each feed line can have twin ground lines on one side (primary surface) of the single feed stalk printed circuit board and a cooperating feed trace on an opposing side (opposing primary surface) that provide RF transmissions from a feed network to a dipole radiator. The twin ground lines for the first feed line can be on a different primary surface than the twin ground lines for the second feed line and one ground line of each twin line set can cross-over each other at a forward end portion of the feed
(Continued)

stalk. The parallel feed stalk printed circuit board can provide two feed lines for a respective dual polarized radiating element.

25 Claims, 11 Drawing Sheets

(51) Int. Cl.
*H01Q 1/48* (2006.01)
*H01Q 9/44* (2006.01)
*H01Q 21/26* (2006.01)

(58) Field of Classification Search
CPC .......... H01Q 21/26; H01Q 1/521; H01Q 5/48; H04B 7/0413; H04B 7/0617
See application file for complete search history.

(56) References Cited

U.S. PATENT DOCUMENTS

| | | | | |
|---|---|---|---|---|
| 2021/0376481 | A1* | 12/2021 | Zhang | H01Q 21/26 |
| 2022/0094065 | A1* | 3/2022 | Milyakh | H01Q 9/285 |
| 2022/0190472 | A1* | 6/2022 | Luo | H01Q 9/285 |
| 2025/0062545 | A1* | 2/2025 | Obermayer | H01Q 25/001 |

* cited by examiner

RADIATING ELEMENTS HAVING SINGLE OR PARALLEL PRINTED CIRCUIT BOARD-BASED FEED STALKS AND BASE STATION ANTENNAS HAVING SUCH RADIATING ELEMENTS

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. Typically, the base station antennas are mounted on a tower or other raised structure, with the radiation patterns (also referred to herein as "antenna beams") that are generated by the base station antennas directed outwardly. In many cases, each base station is divided into "sectors." In one common configuration, a hexagonally shaped cell is divided into three 120" sectors in the azimuth plane (i.e., a plane parallel to the plane defined by the horizon that bisects the base station antenna), and each sector is served by one or more base station antennas that provide coverage throughout the 120° sector. Base station antennas that provide less than omnidirectional (360°) coverage in the azimuth plane are often referred to as "sector" base station antennas. The antenna beams formed by both omnidirectional and sector base station antennas are typically generated by linear or planar phased arrays of radiating elements that are included in the antenna.

In order to accommodate the increasing volume of cellular communications, cellular operators have added cellular service in a variety of new frequency bands. While in some cases it is possible to use a single array of so-called "wide-band" or "ultra-wide-band" radiating elements to provide service in multiple frequency bands, in other cases it is necessary to use different arrays of radiating elements to support service in the different frequency bands.

As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, so-called multi-band base station antennas have been introduced which include multiple arrays of radiating elements. Multi-band base station antennas are now being developed that include arrays that operate in three (or more) different frequency bands and often within multiple sub-bands in one or more of these frequency bands. Unfortunately, the different arrays can interact with each other, which may make it challenging to implement such a multi-band antenna while also meeting customer requirements relating to the size (and particularly the width) of the base station antenna.

SUMMARY

Pursuant to embodiments of the present invention a dual polarized radiating element is provided that includes: a first dipole radiator having a first dipole arm and a second dipole arm; a second dipole radiator having a third dipole arm and a fourth dipole arm; and a feed stalk printed circuit board that is configured to electrically connect the first and second dipole radiators to a feed network. The feed stalk printed circuit board has a first primary surface and a second primary surface opposite the first primary surface. The feed stalk printed circuit board includes a first feed line that is configured to feed radio frequency ("RF") signals to the first dipole radiator, the first feed line comprising a first feed trace on the first primary surface. The feed stalk printed circuit board also includes a first pair of ground lines on the second primary surface and a second feed line that is configured to RF signals to the second dipole radiator. The second feed line has a second feed trace on the second primary surface and a second pair of ground lines on the first primary surface.

The first feed trace comprises a hook shape signal trace segment that includes first and second longitudinally extending portions that are connected by a connecting portion, wherein the first longitudinally extending portion overlaps a first one of the first pair of ground lines and the second longitudinally extending portion overlaps a second one of the first pair of ground lines.

The first feed trace can have a first segment that extends longitudinally and overlaps a first one of the first pair of ground lines and that can merge into a second segment that can extend across a gap that can extend between the first pair of ground lines.

The second segment can extend to a plated through hole and can electrically connect to a ground plane provided by one or more ground lines of the first pair of ground lines on the second primary surface.

A forward end portion of the feed stalk printed circuit board that is adjacent the first and second dipole radiators can be configured to have a first one of the ground lines of the first pair of ground lines cross over to the first primary surface of the feed stalk printed circuit board to connect to the first dipole arm, while a second ground line of the first pair of ground lines at the forward end portion of the feed stalk printed circuit board connects to the second dipole arm.

The forward end portion of the feed stalk printed circuit board can have a plated through hole that provides an electrical path for the first one of the ground lines from the second primary surface to the first primary surface.

The feed stalk printed circuit board can further include first through fourth solder pads that couple the first pair of ground lines and the second pair of ground lines to corresponding ones of the first, second, third and fourth dipole arms.

A first ground line of the second pair of ground lines can cross over a first ground line of the first pair of ground lines.

At least half of a length of the first ground line of the first pair of ground lines can be positioned between a second ground line of the first pair of ground lines and the first ground line of the second pair of ground lines.

The first and second dipole radiators can be formed in a dipole radiator printed circuit board having first and second sides on opposing sides of the feed stalk printed circuit board. A first ground line of the first pair of ground lines can electrically connect to the first dipole arm on the first side of the dipole radiator printed circuit board and a second ground line of the first pair of ground lines can electrically connect to the second dipole arm on the second side of the dipole radiator printed circuit board.

The first, second, third and fourth dipole arms can all directly galvanically coupled to the feed stalk printed circuit board.

The first feed trace can be connected to a center conductor of an RF transmission line.

The first pair of ground lines can be connected to a ground conductor of the RF transmission line.

The feed stalk printed circuit board can have a body with a first end portion configured to reside adjacent a reflector and with an opposing second end portion that is adjacent the first and second dipole radiators. The body can have an angle of inclination between the first and second end portions that is between 20 and 75 degrees.

The first end portion and the second end portion can both be perpendicular to a plane defined by a primary surface of the first and second dipole radiators.

The first feed trace can have a first segment that is wider than a second segment. The second segment can be closer to the first and second dipole radiators and the first segment can overlap the first pair of ground lines.

Other aspects are directed to a dual polarized radiating element that includes a feed stalk printed circuit board that has first and second opposed primary surfaces, the second primary surface having a first pair of ground lines thereon. A first ground line of the first pair of ground lines connects to a first solder pad that is on the second primary surface and the second ground line of the first pair of ground lines connects to a second solder pad that is on the first primary surface. The dual polarized radiating element also includes a first dipole radiator having a first dipole arm and a second dipole arm and a second dipole radiator having a third dipole arm and a fourth dipole arm. The first and second dipole radiators are mounted on a distal end of the feed stalk printed circuit board.

The first primary surface of the feed stalk printed circuit board can have a second pair of ground lines thereon. A first ground line of the second pair of ground lines can connect to a third solder pad that is on the first primary surface and the second ground line of the second pair of ground lines can connect to a fourth solder pad that is on the second primary surface.

The first and second dipole radiators can be formed in a dipole radiator printed circuit board. The distal end of the feed stalk printed circuit board can include a protruding tab that extends through the dipole radiator printed circuit board, and the first through fourth solder pads can be on the protruding tab.

The first ground line of the second pair of ground lines can cross over the first ground line of the first pair of ground lines.

At least half of a length of the first ground line of the first pair of ground lines can be positioned between the second ground line of the first pair of ground lines and the first ground line of the second pair of ground lines.

The first pair of ground lines can define part of a first feed line that is configured to feed radio frequency ("RF") signals to the first dipole radiator. The first feed line can also have a first feed trace that is on the first primary surface.

The dual polarized radiating element can also include a second pair of ground lines that forms part of a second feed line that is configured to feed RF signals to the second dipole radiator, the second feed line further having a second feed trace that is on the second primary surface.

The first feed trace can have a hook shape signal trace segment that includes first and second longitudinally extending portions that can be connected by a connecting portion. The first longitudinally extending portion can overlap a first ground line of the first pair of ground lines and the second longitudinally extending portion can overlap a second ground line of the first pair of ground lines.

The first feed trace can have a first segment that extends longitudinally and that can overlap a first ground line of the first pair of ground lines and that merges into a second segment that extends across a gap that extends between the first pair of ground lines.

The second segment can extend to a plated through hole and can electrically connect to a ground plane provided by one or more ground lines of the first pair of ground lines on the second primary surface.

The feed stalk printed circuit board can have a body with a first end portion configured to reside adjacent a reflector and an opposing second end portion that is adjacent the first and second dipole radiators. The body can have an angle of inclination between the first and second end portions that is between 20 and 75 degrees.

The first end portion and the second end portion can both be perpendicular to a plane defined by a primary surface of the first and second dipole radiators.

Still other embodiments are directed to a dual polarized radiating element that includes: a first dipole radiator having a first dipole arm and a second dipole arm; a second dipole radiator having a third dipole arm and a fourth dipole arm; and first and second feed stalk printed circuit boards that have primary surfaces that face each other.

The first and second feed stalk printed circuit boards can be spaced apart by less than $1/20^{th}$ of a wavelength corresponding to a center frequency of an operating frequency band of the dual polarized radiating element.

The primary surfaces can be parallel to each other over at least a major portion of a longitudinal distance between opposing end portions thereof.

The first through fourth dipole arms can be formed in respective first through fourth quadrants of a dipole radiator printed circuit board. Electrical connections between the feed stalk printed circuit board and the first and third dipole arms can be in the respective first and third quadrants, while electrical connections between the feed stalk printed circuit board and the second and fourth dipole arms can be in the respective fourth and second quadrants.

The first and second feed stalk printed circuit boards can each have a body with a first end portion configured to reside adjacent a reflector and an opposing second end portion that is adjacent the first and second dipole radiators. The body can have an angle of inclination between the first and second end portions that is between 20 and 75 degrees.

The first end portion and the second end portion can both be perpendicular to a plane defined by a primary surface of the first and second dipole radiators.

Other embodiments are directed to a base station antenna that has a plurality of the dual polarized radiating elements described herein. The dual polarized radiating elements may reside only along right and left side portions of the base station antenna.

DETAILED DESCRIPTION

Embodiments of the present invention relate generally to radiating elements for multi-band base station antennas and to related base station antennas. The base station antennas that include radiating elements according to embodiments of the present invention may be used, for example, as sector antennas in the above-described cellular communications systems.

Figure 1A:
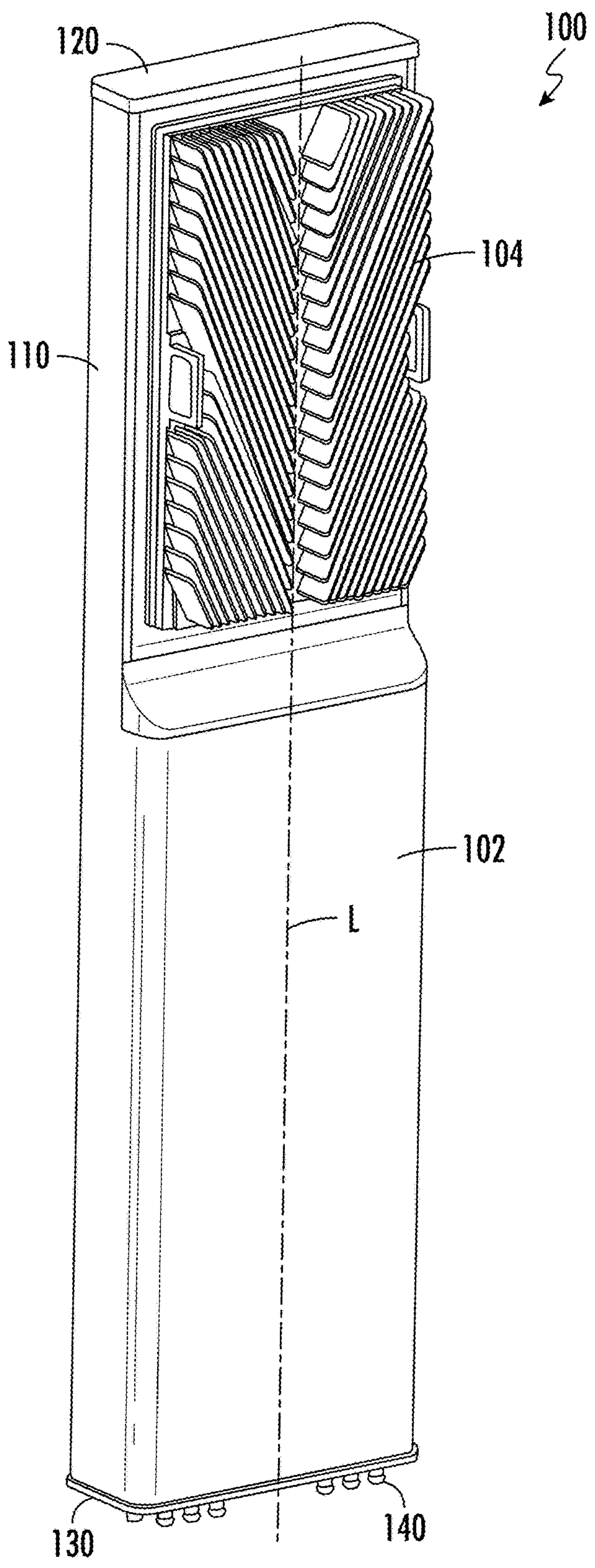
FIG. 1A (PRIOR ART)
FIG. 1A is a rear perspective view of a multi-band sector base station antenna.
Figure 1B:
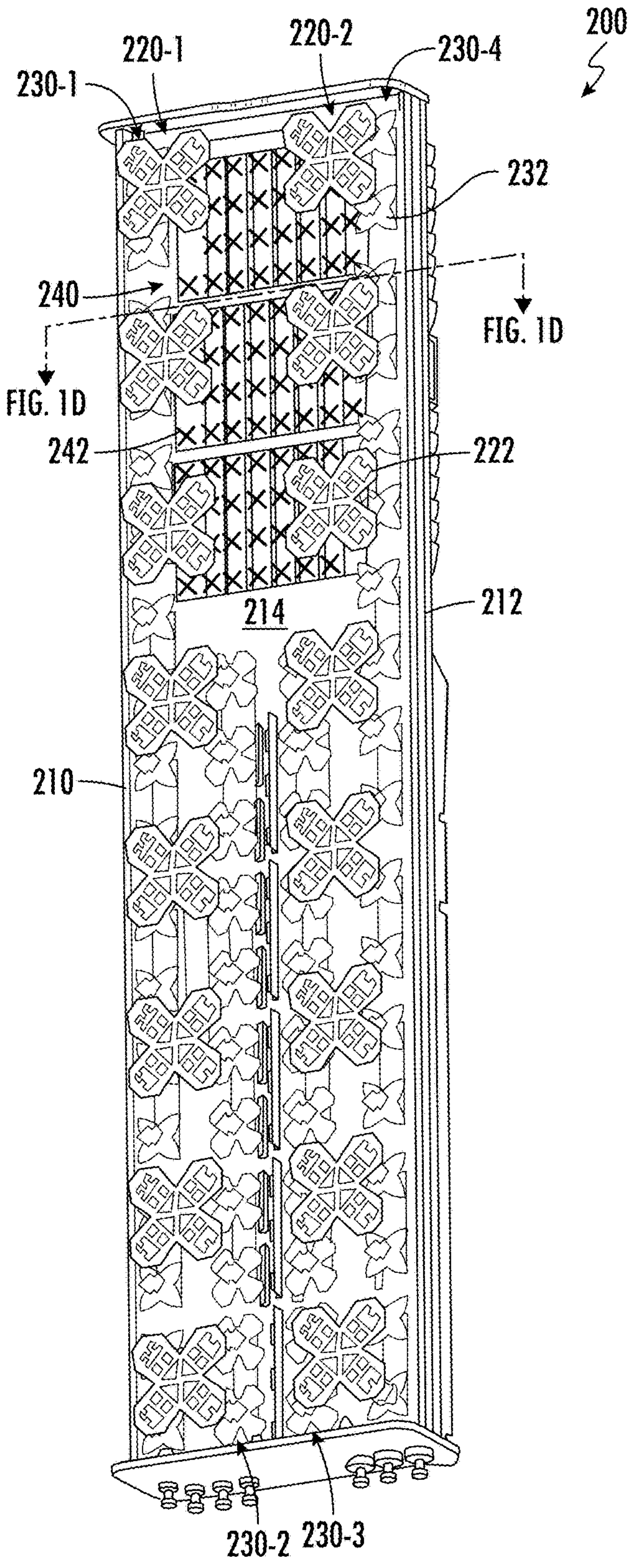
FIG. 1B (PRIOR ART)
FIG. 1B is a schematic, front perspective view of the base station antenna of FIG. 1A with the radome removed.
Figure 1C:
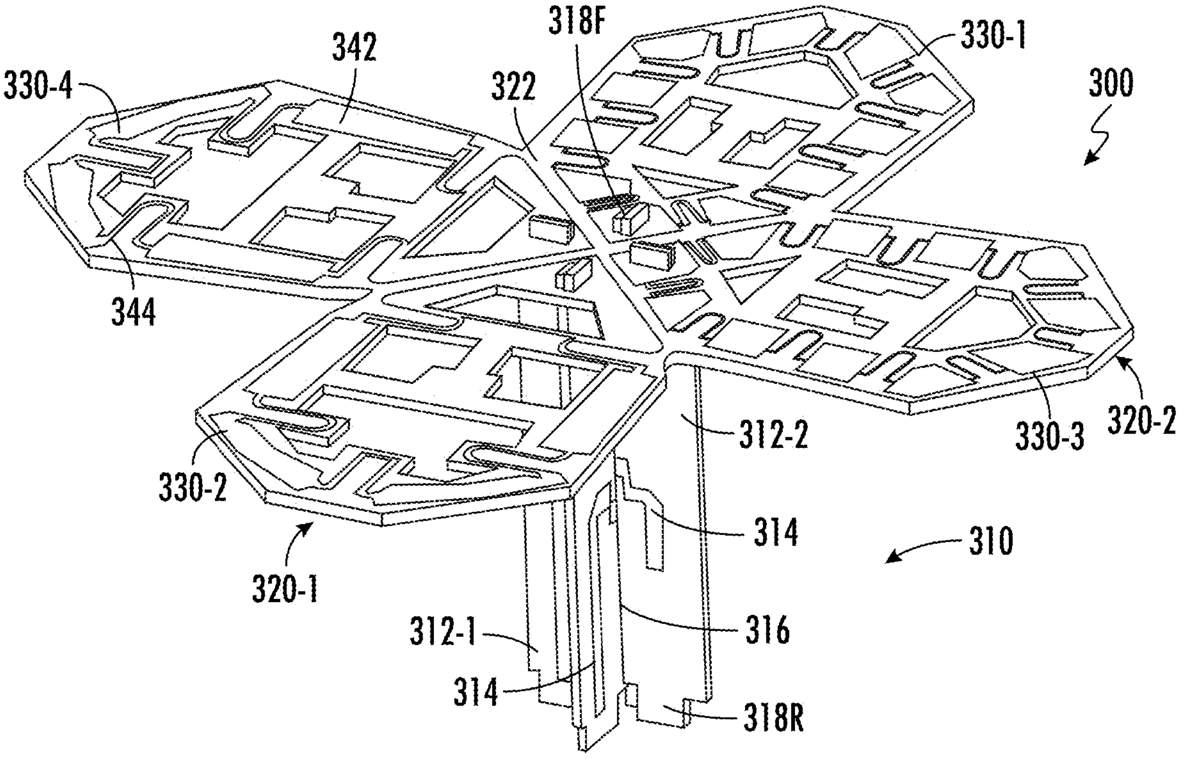
FIG. 1C (PRIOR ART)
FIG. 1C is an enlarged perspective view of one of the low-band radiating elements included in the base station antenna of FIGS. 1A-1B.
Figure 1D:
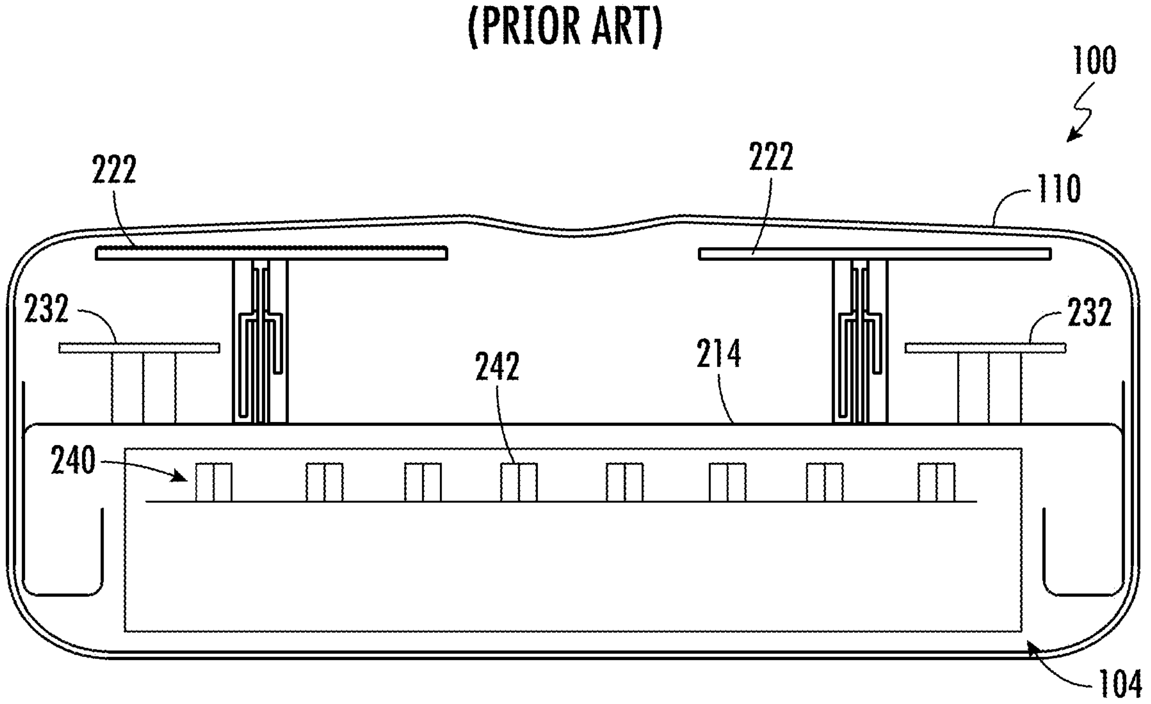
FIG. 1D (PRIOR ART)
FIG. 1D is a schematic cross-sectional view of the base station antenna of FIGS. 1A-1B.

FIGS. 1A-1D illustrate a design for a conventional base station antenna that has arrays of radiating elements that operate in multiple frequency bands. In particular, FIG. 1A is a rear perspective view of the antenna 100, while FIG. 1B is a schematic front view of the antenna 100 with the radome thereof removed to illustrate an antenna assembly 200 of the antenna 100. FIG. 1C is a schematic perspective view of one of the low band radiating elements included in base station antenna 100, and FIG. 1D is a schematic cross-sectional view taken along line 1D-1D of FIG. 1B. In the description that follows, the antenna 100 and the radiating elements included therein will be described using terms that assume that the antenna 100 is mounted for normal use on a tower with a longitudinal axis of the antenna 100 extending along a vertical axis and the front surface of the antenna 100 mounted opposite the tower pointing toward the coverage area for the antenna 100.

As shown in FIG. 1A, the base station antenna 100 may comprise, for example, both a passive base station antenna 102 and an active antenna unit 104 that is mounted on the passive base station antenna 102. The passive base station antenna 102 may include a plurality of arrays of radiating elements that generate static antenna beams that cover predefined regions such as a sector of a cell. The passive base station antenna 102 may be connected to one or more radios (not shown) such as, for example, remote radio heads that are mounted on the antenna tower adjacent the base station antenna 100. The active antenna unit 104 may, for example, comprise a module that may operate as a standalone antenna or that can be mounted on the rear of the passive base station antenna 102. The active antenna unit 104 may include, for example, radio circuitry and a multi-column beamforming array of radiating elements. The active antenna unit 104 may generate antenna beams that can be dynamically steered throughout a coverage area (e.g., a sector) and which can have narrow azimuth beamwidths and high antenna gain. Examples of base station antennas that include both a passive base station antenna 102 and an active antenna unit 104 that is mounted on the passive base station antenna 102 are described, for example, in U.S. Patent Publication No. 2021/0305717 (“the ’717 publication”), filed Mar. 23, 2021, the entire content of which is incorporated herein by reference. It will be appreciated that any of the radiating elements according to embodiments of the present invention disclosed herein may be used to form the low-band arrays in the various base station antennas disclosed in the ’717 publication.

Still referring to FIG. 1A, the passive base station antenna 102 is an elongated structure that extends along a longitudinal axis L. The passive base station antenna 102 may have a tubular shape with a generally rectangular cross-section. The passive base station antenna 102 includes a radome 110 and a top end cap 120. The passive base station antenna 102 also includes a bottom end cap 130 which includes a plurality of connectors 140 such as RF ports mounted therein. The passive base station antenna 102 is typically mounted in a vertical configuration (i.e., the longitudinal axis L may be generally perpendicular to a plane defined by the horizon) when the antenna 102 is mounted for normal operation. The radome 110, top cap 120 and bottom cap 130 may form a protective housing for the passive base station antenna 102. An antenna assembly 200 (FIG. 1B) for the passive base station antenna 102 is contained within the housing.

The active antenna unit 104 is mounted on the rear of the passive base station antenna 102. The active antenna unit 104 may include a multi-column array of radiating elements that is mounted behind a radome of the active antenna unit 104. As described in the ’717 publication, the multi-column array of radiating elements may transmit and receive RF signals through the passive base station antenna 102. A reflector of the passive base station antenna 102 may include an opening (or a frequency selective surface that will appear as an opening to RF energy in the operating frequency band of the multi-column array).

Referring to FIG. 1B, the antenna assembly 200 of the passive base station antenna 102 includes a ground plane structure 210 that has sidewalls 212 and a reflector surface 214. Various mechanical and electronic components of the passive base station antenna 102 (not shown) may be mounted in a chamber that is defined between the sidewalls 212 and the back side of the reflector surface 214 such as, for example, phase shifters, remote electronic tilt units, mechanical linkages, controllers, diplexers, and the like. The reflector surface 214 of the ground plane structure 210 may comprise or include a metallic surface (e.g., a sheet of aluminium) that serves as a reflector and ground plane for the radiating elements of the antenna 100. Herein, the reflector surface 214 may also be referred to as the reflector 214.

The passive base station antenna 102 includes a plurality of dual-polarized radiating elements that are mounted to extend forwardly from the reflector 214. The radiating elements include low-band radiating elements 222 and mid-band radiating elements 232. The low-band radiating elements 222 are mounted in two columns to form two linear arrays 220-1, 220-2 of low-band radiating elements 222. The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The mid-band radiating elements 232 are mounted in four columns to form four linear arrays 230-1 through 230-4 of mid-band radiating elements 232. The mid-band radiating elements 232 may be configured to transmit and receive signals in a second frequency band. In some embodiments, the second frequency band may comprise the 1427-2690 MHZ frequency range or a portion thereof (e.g., the 1710-2200 MHz frequency band, the 2300-2690 MHz frequency band, etc.). Herein, the linear arrays 220-1, 220-2 of low-band radiating elements 222 may also be referred to as the low-band linear arrays 220-1, 220-2, and the linear arrays 230-1 through 230-4 of mid-band radiating elements 232 may also be referred to as the mid-band linear arrays 230-1 through 230-4. It should be noted that herein like elements may be referred to individually by their full reference numeral (e.g., linear array 230-2) and may be referred to collectively by the first part of their reference numeral (e.g., the linear arrays 230).

As discussed above, the active antenna module 104 includes a multi-column array of high-band radiating elements 242. This array of high-band radiating elements 242 may be referred to herein as a high-band array 240. A radome of the active antenna module 104 is omitted in FIG. 1B so that this high band array 240 of high-band radiating elements 242 is visible in the figure. The high-band radiating elements 242 may be configured to transmit and receive signals in a third frequency band. In some embodiments, the third frequency band may comprise the 3300-4200 MHz frequency range or a portion thereof. As discussed above, the high-band array 240 may be a beamforming array that in conjunction with the beamforming radio in the active antenna module 104 can generate antenna beams that can be dynamically shaped and steered across a coverage area.

FIG. 1C illustrates a low-band radiating element 300 that corresponds to the low-band radiating elements 222 of base station antenna 100. The radiating element 300 includes a feed stalk 310 that comprises a pair of feed stalk printed circuit boards 312-1, 312-2, and first and second dipole radiators 320-1, 320-2. The first dipole radiator 320-1 extends along a first axis and the second dipole radiator 320-2 extends along a second axis that is generally perpendicular to the first axis. Consequently, the first and second dipole radiators 320-1, 320-2 are arranged in the general shape of a cross. The first dipole radiator 320-1 includes first and second dipole arms 330-1, 330-2, and the second dipole radiator 320-2 includes third and fourth dipole arms 330-3, 330-4. The first and second dipole radiators 320-1, 320-2 are formed on a dipole radiator printed circuit board 322 in the depicted embodiment.

Each feed stalk printed circuit board 312-1, 312-2 may have a respective RF transmission line 314 formed thereon. Each RF transmission line 314 is designed to pass RF signals between a feed board (not shown) and a respective one of the dipole radiators 320. Each RF transmission line 314 may comprise a hook balun. The first feed stalk printed circuit board 312-1 includes a slit 316 in a rear portion thereof and the second feed stalk printed circuit board 312-2 includes a slit 316 (not visible in the figure) in the front portion thereof. These vertical slits 316 allow the two feed stalk printed circuit boards 312-1, 312-2 to be assembled together to form the feed stalk 310, which is a vertically extending column that has a generally x-shaped cross-section. Rearward portions of each feed stalk printed circuit board 312 may include projections 318R that are inserted through slits in a feed board (not shown) to mount the radiating element 300 thereon. Forward portions of each feed stalk printed circuit board 312 may include projections 318F that are inserted through slits in the dipole radiator printed circuit board 322 to mount the dipole radiator printed circuit board 322 on the feed stalk 310.

Dipole arms 330-1 and 330-2 of first dipole radiator 320-1 are center fed by a first of the RF transmission lines 314 and radiate together at a first polarization. In the depicted embodiment, the first dipole radiator 320-1 is designed to transmit signals having a slant +45° linear polarization. Dipole arms 330-3 and 330-4 of second dipole radiator 320-2 are center fed by the second of the RF transmission lines 314 and radiate together at a second polarization that is orthogonal to the first polarization. The second dipole radiator 320-2 is designed to transmit signals having a slant −45° linear polarization. The radiating element 300 is thus referred to as a “cross-dipole” radiating element.

A challenge in the design of multi-band base station antennas is reducing the effect of scattering of the RF signals at one frequency band by the radiating elements of other frequency bands. Scattering is undesirable as it may affect the shape of the antenna beam in both the azimuth and elevation planes, and the effects may vary significantly with frequency, which may make it hard to compensate for these effects. Moreover, at least in the azimuth plane, scattering tends to impact the beamwidth, beam shape, pointing angle, gain and front-to-back ratio of the antenna beams in undesirable ways.

As shown in FIG. 1C, each dipole arm 330 may comprise an oval-shaped metal pattern on the dielectric substrate of the dipole radiator printed circuit board 322. The metal pattern forming each dipole arm 330 includes a plurality of widened sections 342 that are connected by narrowed trace sections 344. This design allows the dipole arms 330 to act as “cloaking” dipole arms that have reduced impact on the antenna beams generated by closely located radiating elements that transmit and receive signals in other frequency bands (i.e., reduced scattering). This ensures that the radiating element 300 will not substantially impact the radiation pattern of other radiating elements of antenna 100 that are mounted near radiating element 300. Dipole arms 330-1 and 330-3 may be located near (e.g., directly in front of) mid-band radiating elements 232 of antenna 100, and hence have metal patterns that are designed to be substantially transparent to RF energy in the mid-band operating frequency band. Dipole arms 330-2 and 330-4 may be located near (e.g., directly in front of) high-band radiating elements 242 of antenna 100, and hence have metal patterns that are designed to be substantially transparent to RF energy in the high-band operating frequency band.

FIG. 1D is a schematic transverse cross-sectional view of base station antenna 100 taken along line 1D-1D of FIG. 1B. As can be seen from FIG. 1D, the feed stalks of the low-band radiating elements 222 (which have the design of low-band radiating element 300 of FIG. 1C) are positioned forwardly of the high-band array 240. Since the radiating elements 222 need to be mounted on a ground plane, this means a metal layer must be positioned in front of the high-band array 240 which acts as a mounting location and ground plane for the low-band radiating elements 222. Unfortunately, this metal layer may block RF energy transmitted by the high-band array 240.

Figure 2A:
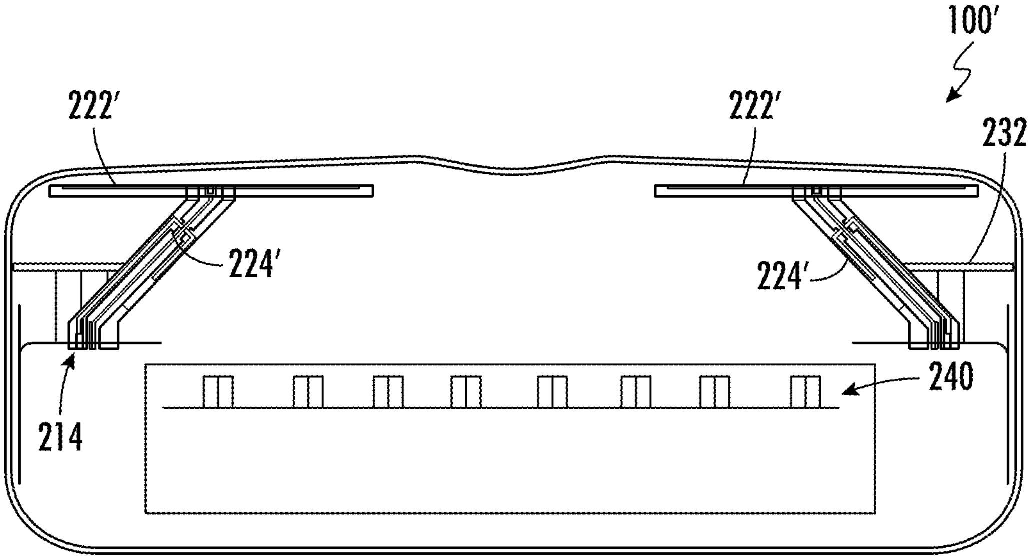
FIG. 2A (PRIOR ART)
FIG. 2A is a schematic cross-sectional view of a modified version of the base station antenna of FIGS. 1A-1B in which “tilt-stalk” low-band radiating elements are used to replace the “straight-stalk” low-band radiating elements of FIGS. 1C-1D.

In order to reduce the impact of the low-band radiating elements 222 on the high-band array, low-band radiating elements having tilted feed stalks have been proposed, as is discussed in detail in U.S. Patent Publication No. 2021/0305718 ("the '718" publication"), filed Mar. 18, 2021, the entire content of which is incorporated herein by reference. FIG. 2A is a schematic transverse cross-sectional view of a modified version of base station antenna 100 (labelled antenna 100') that includes low-band radiating elements 222' that have tilted feed stalks 224'. The tilted feed stalks 224' allow the base of each low-band radiating element 222' to be mounted to the side of the high-band array 240 so that the reflector 214 for the low-band radiating elements 222' need not extend in front of the high-band array 240.

Figure 2B:
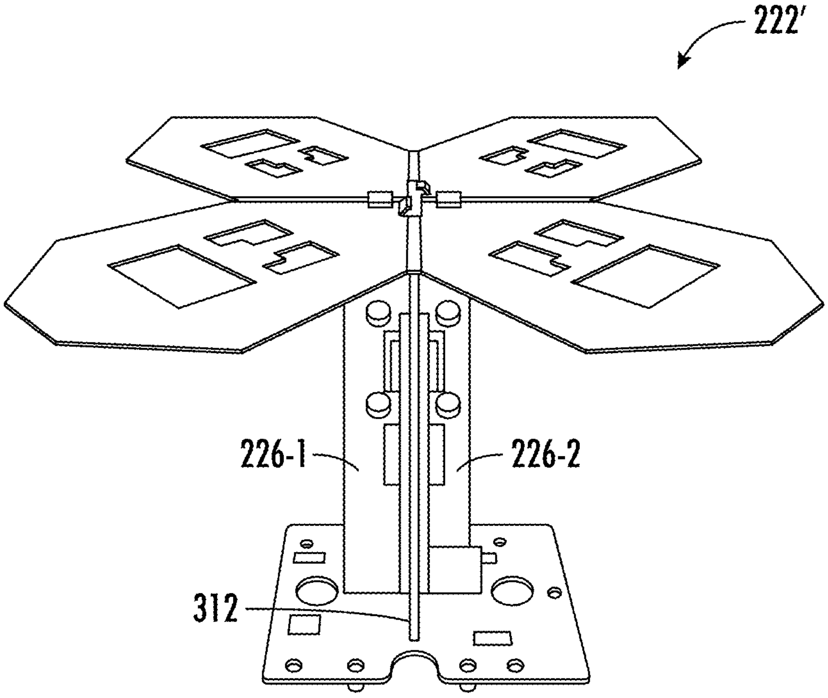
FIG. 2B (PRIOR ART)
FIG. 2B is a perspective view of one of the tilt-stalk low-band radiating elements included in the antenna of FIG. 2A.

Unfortunately, the tilted feed stalks 224' for the low-band radiating elements 222' may still negatively impact the performance of the high-band array 240. The feed stalks 224' may have the same "x" shape that is seen in the feed stalk 310 of the radiating element 300 of FIG. 1C, except that one of the feed board printed circuit boards 312 is replaced with a pair of bent pieces of sheet metal 226-1, 226-2, as is shown in FIG. 2B. The bent pieces of sheet metal 226 extend in front of the high-band array 240 and can negatively impact the performance thereof.

Pursuant to embodiments of the present invention, cross-dipole radiating elements are provided that have improved feed stalk designs. In particular, these radiating elements may include feed stalks that are designed to have reduced impact on the radiation patterns of radiating elements (or arrays thereof) that are located behind the radiating elements according to embodiments of the present invention.

In some embodiments, a single printed circuit board (PCB) feed stalk is used to feed the cross-dipole radiators of a dual polarized radiating element which can reduce the performance impact on adjacent higher band element(s) over other known dual polarized radiating elements by eliminating the use of sheet metal legs and can also reduce costs of conventional feed stalks with multiple cooperating substrates, such as feed stalks with sheet metal legs and printed circuit boards or feed stalks with orthogonal printed circuit boards. The single PCB feed stalk configuration can also provide a cross-over on the feed stalk printed circuit board, rather than on the dipole radiator circuit board, that can improve isolation performance and/or which can allow for direct galvanic connections to respective dipole radiators.

In other embodiments, a dual polarized radiating element with a pair of feed stalks that face each other to be parallel or substantially parallel, instead of orthogonal to each other, can be used to feed respective dipole radiators. The pair of feed stalks eliminate the metal legs for better scanning performance and may allow for easier matching over single PCB feed stalks. Additionally, both feed stalks may be oriented so that their major/primary surfaces are perpendicular to the high band array, which may dramatically reduce the impact of feed stalks on the scanning performance of the high-band array.

Embodiments of the present invention will now be described in further detail with reference to the attached figures.

Referring now to FIGS. 3A-3G, an example dual polarized radiating element 400 with a single feed stalk printed circuit board 412 is shown. The dual polarized radiating element 400 can be used in place of the low band radiating elements 222, 222' of the base station antenna 100 (FIGS. 1A, 1B, 1D).

The radiating element 400 includes a feed stalk 410 that comprises a single feed stalk printed circuit board 412, and first and second dipole radiators 420-1, 420-2. The first dipole radiator 420-1 extends along a first axis and the second dipole radiator 420-2 extends along a second axis that is generally perpendicular to the first axis. Consequently, the first and second dipole radiators 420-1, 420-2 are arranged in the general shape of a cross. The first dipole radiator 420-1 includes first and second dipole arms 430-1, 430-2, and the second dipole radiator 420-2 includes third and fourth dipole arms 430-3, 430-4. The first and second dipole radiators 420-1, 420-2 are formed on a dipole radiator printed circuit board 422 in the depicted embodiment.

The feed stalk printed circuit board 412 has a first primary surface 412-P1 and an opposing second primary surface 412P-2. The feed stalk printed circuit board 412 has a first feed line 414-1 and a second feed line 414-2 formed thereon. Each feed line 414 is configured to pass/feed RF signals between a feed board 415 (FIG. 3A) with a feed network 415F and a respective one of the dipole radiators 420.

The first feed line 414-1 comprises a feed trace 416 on the first primary surface 412-P1 and at least one cooperating ground line 417, shown as a cooperating pair of first and second ground lines $\mathbf{417}_1$, $\mathbf{417}_2$, on an opposing primary surface 412-P2. The second feed line 414-2 comprises a feed trace 416 on the second primary surface 412-P2 and at least one ground line 417 on the first primary surface 412-P1. The broken lines in FIGS. 3A, 3B of one pair of the ground lines 417 and one feed trace 416, indicate the positions on the second primary surface 412-P2.

Each feed trace 416 can have a first segment 4110 that extends longitudinally (relative to a length of the feed stalk 410) over a sub-length of the feed stalk 410 and can overlap one of the corresponding ground lines 417 for at least a major portion of its length. An end portion of the feed trace 416*e* that is closer to the feed board 415 and can be wider and can extend across both of the first and second ground lines $\mathbf{417}_1$, $\mathbf{417}_2$. Each feed trace 416 can comprise a second segment 416S that connects to one of corresponding ground lines 417 on the opposite side of the printed circuit board 412 through a plated through hole 419 to connect to a ground plane provided by one or more of the ground lines $\mathbf{417}_1$, $\mathbf{417}_2$. In operation, the feed trace 416 can electrically short circuit to the ground line 417 through the plated through hole 419.

The first and second ground lines $\mathbf{417}_1$, $\mathbf{417}_2$ of each pair 417-P1, 417-P2 of ground lines 417 can be separated by a longitudinally extending gap space 440. The second segment 416S of each feed trace 416 can extend across the respective gap spaces 440 to the respective plated through holes 419.

Dipole arms 430-1 and 430-2 of first dipole radiator 420-1 are center fed by a first of the RF transmission lines 414 and radiate together at a first polarization. In the depicted embodiment, the first dipole radiator 420-1 is designed to transmit signals having a slant +45° linear polarization.

Dipole arms 430-3 and 430-4 of second dipole radiator 420-2 are center fed by the second of the RF transmission lines 314 and radiate together at a second polarization that is orthogonal to the first polarization. The second dipole radiator 420-2 is designed to transmit signals having a slant −45° linear polarization. As discussed above, the radiating element 400 is thus referred to as a "cross-dipole" radiating element.

A forward portion of the feed stalk printed circuit board 412 may include a projection, also referred to as a forwardly projecting tab, 418F with four ground line ends 417*e*. The projection 418F is inserted through a slit in the dipole radiator printed circuit board 422 to mount the dipole radiator printed circuit board 422 on the feed stalk 410. While a single projection is shown, this may instead be provided as a plurality of smaller projections and each projection may extend forward of the dipole radiator printed circuit board 422 the same distance or different distances.

Figure 3A:
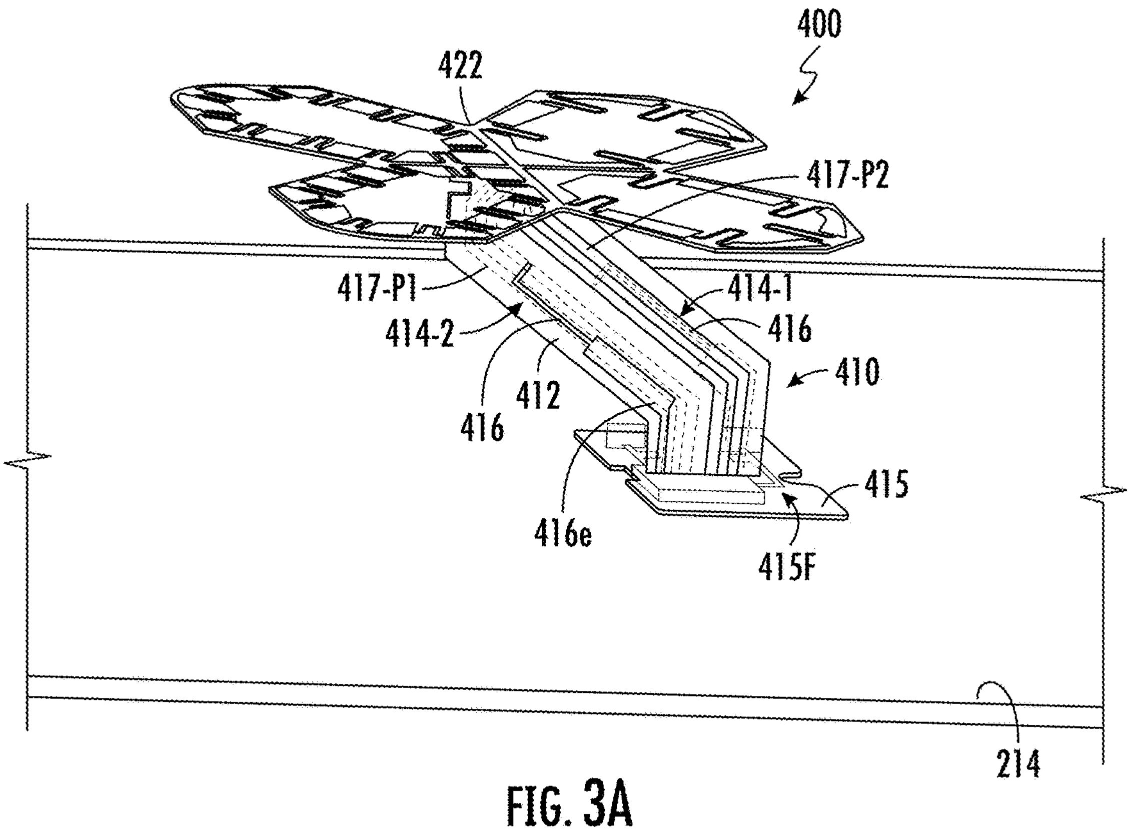
FIG. 3A is a shadow side perspective view of a tilt-stalk low-band radiating element according to embodiments of the present invention that includes a single feed stalk printed circuit board.
Figure 3B:
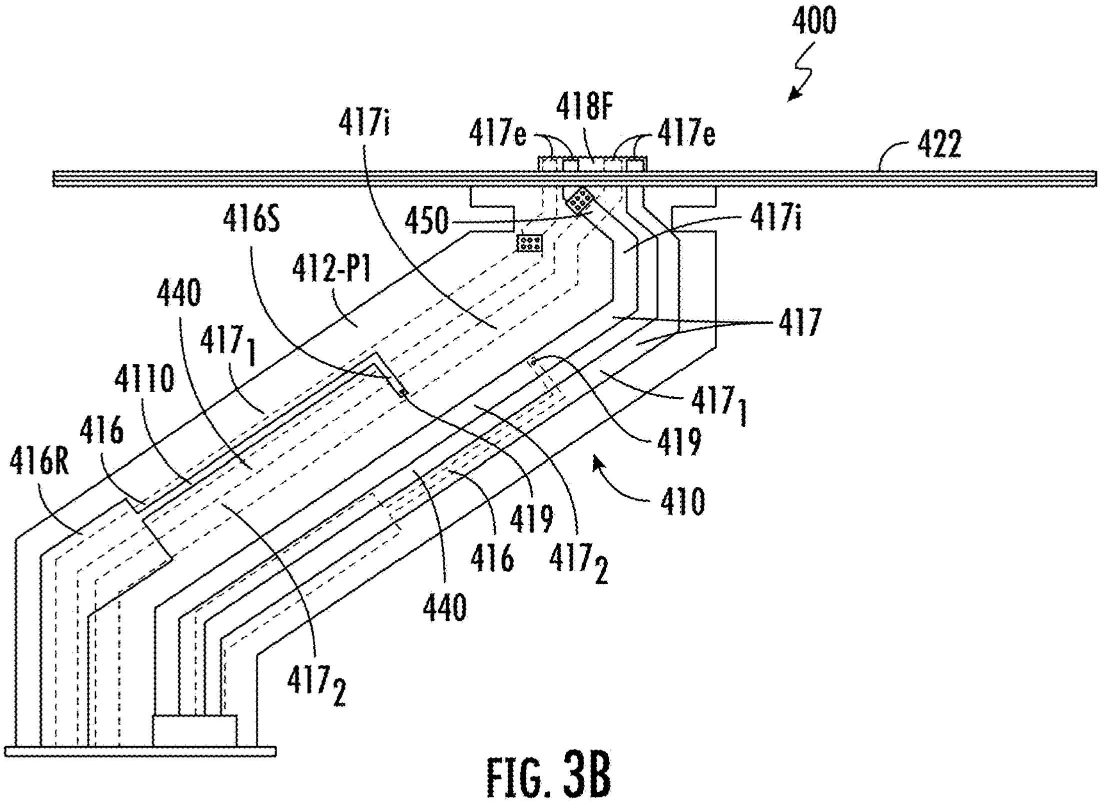
FIGS. 3B and 3C are shadow left and right-side views, respectively, of the low-band radiating element of FIG. 3A.
Figure 3C:
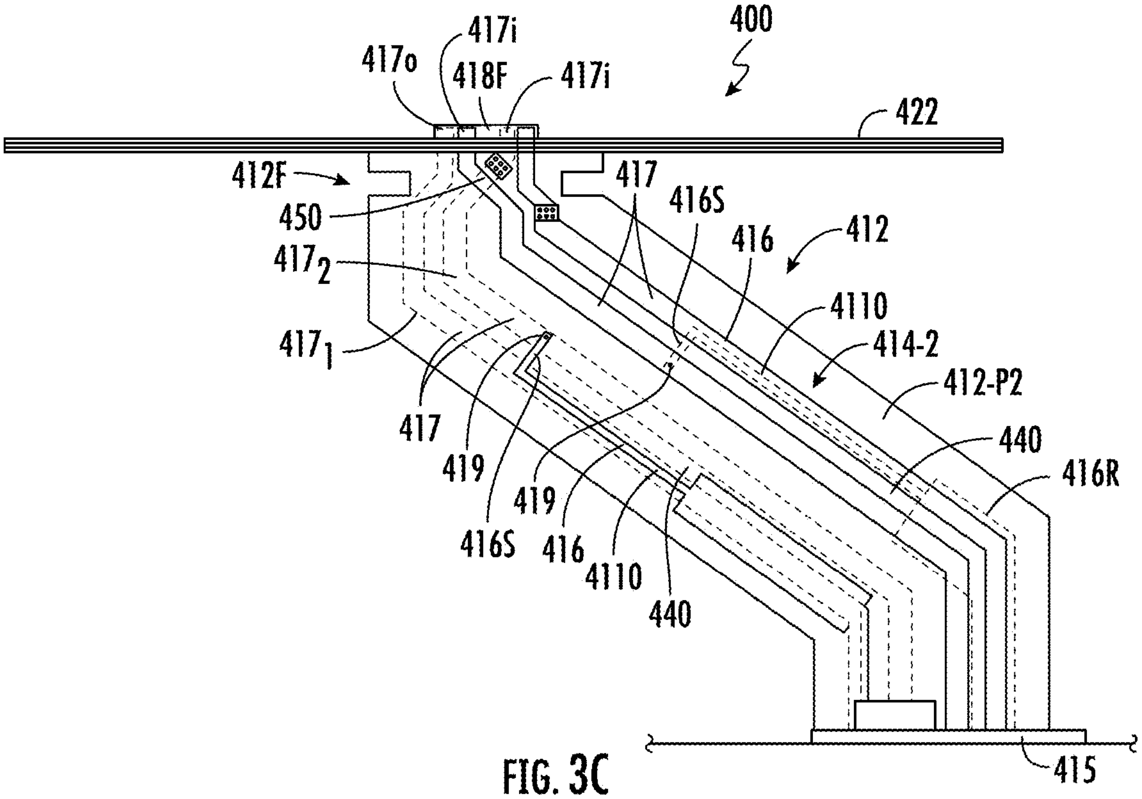
Figure 3D:
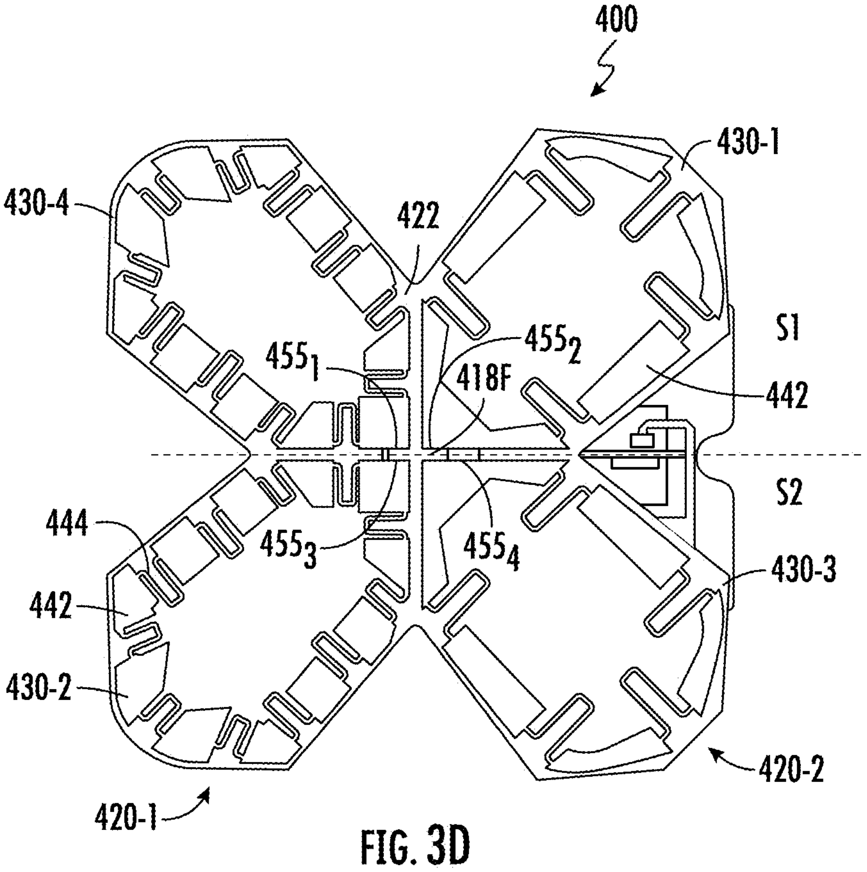
FIG. 3D is a front view of the low-band radiating element of FIG. 3.4.

As shown in FIG. 3D, each dipole arm 430 may comprise a shaped metal pattern on the dielectric substrate of the dipole radiator printed circuit board 422. The metal pattern forming each dipole arm 430 includes a plurality of widened sections 442 that are connected by narrowed trace sections 444. This design allows the dipole arms 430 to act as "cloaking" dipole arms that have reduced impact on the antenna beams generated by closely located radiating elements that transmit and receive signals in other frequency bands. This ensures that the radiating element 400 will not substantially impact the radiation pattern of other radiating elements of antenna 100 that are mounted near radiating element 400. Dipole arms 430-1 and 430-3 may be located near (e.g., directly in front of) mid-band radiating elements 232 of antenna 100, and hence have metal patterns that are designed to be substantially transparent to RF energy in the mid-band operating frequency band. Dipole arms 430-2 and 430-4 may be located near (e.g., directly in front of) high-band radiating elements 242 of antenna 100, and hence have metal patterns that are designed to be substantially transparent to RF energy in the high-band operating frequency band.

One of the ground lines of each pair 417-P1, 417-P2, shown as the inner line 417*i* of each of the two ground lines $\mathbf{417}_1$, $\mathbf{417}_2$, can cross over each other at a crossover segment 450 positioned at a forward (distal) end portion 412F of the feed stalk printed circuit board 412 so that a forward segment 417*s* of the inner line 417*i* of the first pair of ground lines 417-P1 resides adjacent the outer ground line 417*o* of the second pair 417-P2 of ground lines 417 at a location in front of the crossover segment 450.

Also, the one of the ground lines of each pair 417-P1, 417-P2, shown as the inner line 417*i* of each of the two ground lines $\mathbf{417}_1$, $\mathbf{417}_2$, that crosses over at the crossover segment 450, moves from one side of the feed stalk 410 to the other side of the feed stalk 410.

A forward end portion of the feed stalk printed circuit board 412F that is adjacent the first and second dipole radiators 420-1, 420-2 can be configured to have a first one of the ground lines 417 of the first pair of ground lines 417-P1 cross over to the first primary surface 412-P1 of the feed stalk printed circuit board 412 to connect to the first dipole arm 430-1, while a second ground line 417 of the first pair of ground lines 417-P1 at the forward end portion of the feed stalk printed circuit board connects to the second dipole arm 430-2.

Referring to FIG. 3C, the forward end portion 412F of the feed stalk printed circuit board 412 can have one or more plated through holes (PTH) 460 that provide an electrical path for the first one of the ground lines 417 from the second primary surface 412-P2 to the first primary surface 412-P1.

At least half of a length of the second ground line $\mathbf{417}_2$ of the first pair 417-P1 of ground lines 417 is positioned between a first ground line $\mathbf{417}_1$ of the first pair 417-P1 of ground lines 417 and the first and/or second ground line $\mathbf{417}_1$, $\mathbf{417}_2$, respectively, of the second pair 417-P2 of ground lines 417.

Referring to FIG. 3D, the dual polarized radiating element 400 can be configured so that the first and second dipole radiators 420-1, 420-2, respectively, are formed in a dipole radiator printed circuit board 422 having a first side S1 and a second side S2 in a plane of the dipole radiators. The first ground line 417 of the first pair 417-P1 of ground lines 417 electrically connects to the first dipole arm 430-1 on the first side of the dipole radiator printed circuit board 422 and the second ground line 417 of the first pair 417-P1 of ground lines 417 electrically connects to the second dipole arm 430-2 on the second side of the dipole radiator printed circuit board 422. The first ground line 417 of the second pair 417-P2 of ground lines 417 electrically connects to the third dipole arm 430-3 on the first side of the dipole radiator printed circuit board 422 and the second ground line 417 of the second pair 417-P2 of ground lines 417 electrically connects to the fourth dipole arm 430-4 on the second side of the dipole radiator printed circuit board 422.

Figure 3E:
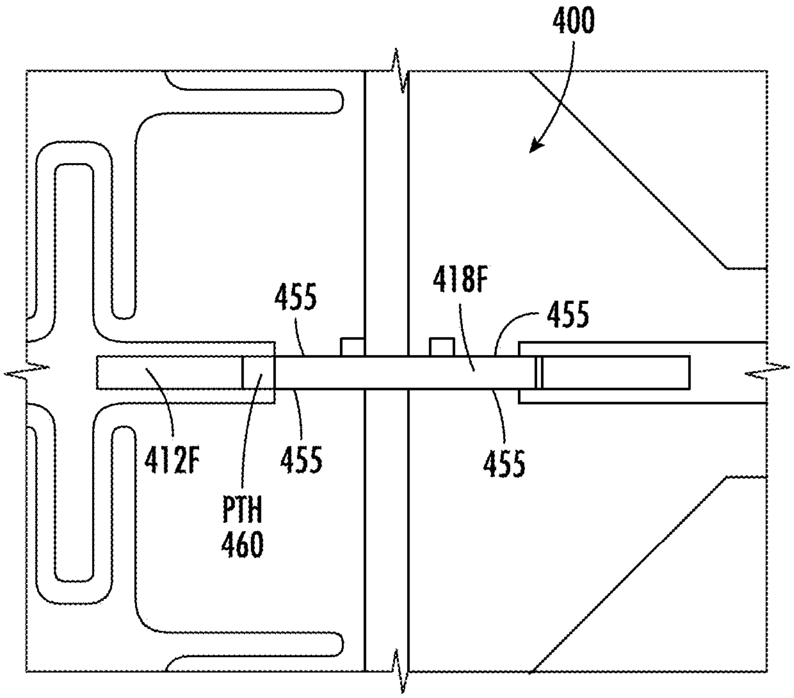
FIG. 3E is a greatly enlarged front view of the connection between the feed stalk printed circuit board and the dipole radiator printed circuit board of the low-band radiating element of FIG. 3A.
Figure 3F:
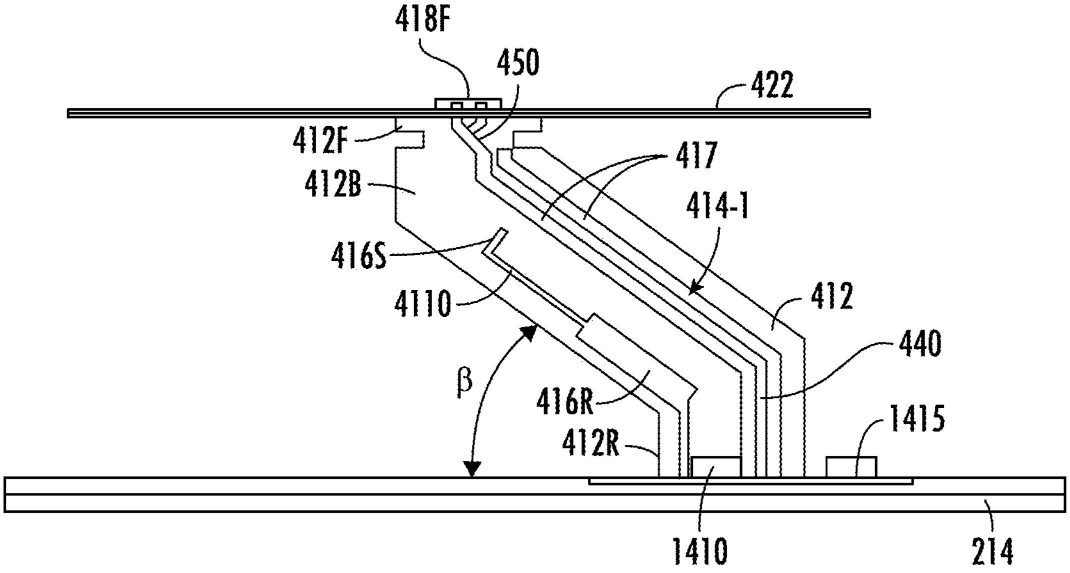
FIGS. 3F and 3G are schematic right and left side views, respectively, of the low-band radiating element of FIG. 3A.

Referring to FIG. 3F, each feed trace 416 can be connected to a corresponding center conductor 1410 of an RF transmission line such as a coaxial cable. Each pair of ground lines 417-P can be connected to a ground conductor 1415 of the RF transmission line. The RF transmission lines can be, for example, microstrip transmission lines on the feed boards or coaxial cables or other cables that terminate directly into the feed stalks. To simplify the drawings, the RF transmission line elements are simply shown as blocks in the figures to emphasize that any appropriate RF transmission line structure may be used.

Referring to FIG. 3F, the feed stalk printed circuit board 412 has a body 412B with a first (rear) end portion 412R configured to reside adjacent a reflector 214 and an opposing second (forward) end portion 412F that is adjacent the first and second dipole radiators 420-1, 420-2. The body 412B can have an angle of inclination B relative to the feed board 415 and/or reflector 214 that is between the first and second end portions, 412R, 412F, respectively, that is between 20 and 75 degrees.

The first end portion 412R and the second end portion 412F can both be perpendicular to a plane defined by a primary surface of the printed circuit board 422 providing the first and second dipole radiators 420-1, 420-2.

Referring to FIGS. 3B, 3C, 3F and 3G, the feed trace 416 can have a rearward segment 416R that is wider than the second segment 416S and the first longitudinally extending segment 4110. The first longitudinally extending segment 4110 and the second segment 416S are closer to the first and second dipole radiators 420-1, 420-2. The second segment 416S overlaps one corresponding pair of ground lines 417.

Referring to FIGS. 3D and 3E, each of the four ground lines 417 can be directly soldered/galvanically attached at a respective solder joint 455, to one of four solder joints $\mathbf{455}_1$-$\mathbf{455}_4$, which can be provided by respective solder pads, to a corresponding one of the dipole arms 430 on a forward side of the dipole radiator printed circuit board 422. The first, second, third and fourth dipole arms 430-1, 430-2, 430-3 and 430-4 can all be directly galvanically coupled to the feed stalk printed circuit board 422.

One ground line of each pair 417-P1, 417-P2 of ground lines 417 can connect to a respective one of the solder pads 455 that is on one of the first primary surface 412-P1 or the second primary surface 412-P2 and the other ground line 417 of the corresponding pair of ground lines connects to a second solder pad 455 that is on the opposing primary surface of the feed stalk printed circuit board 412.

The first through fourth solder pads $455_1$-$455_2$ can all be on the protruding tab 418F that protrudes forward of the dipole radiator printed circuit board 422, with two on one primary surface 412-P1 and two on the other primary surface 412-P2.

Figure 4A:
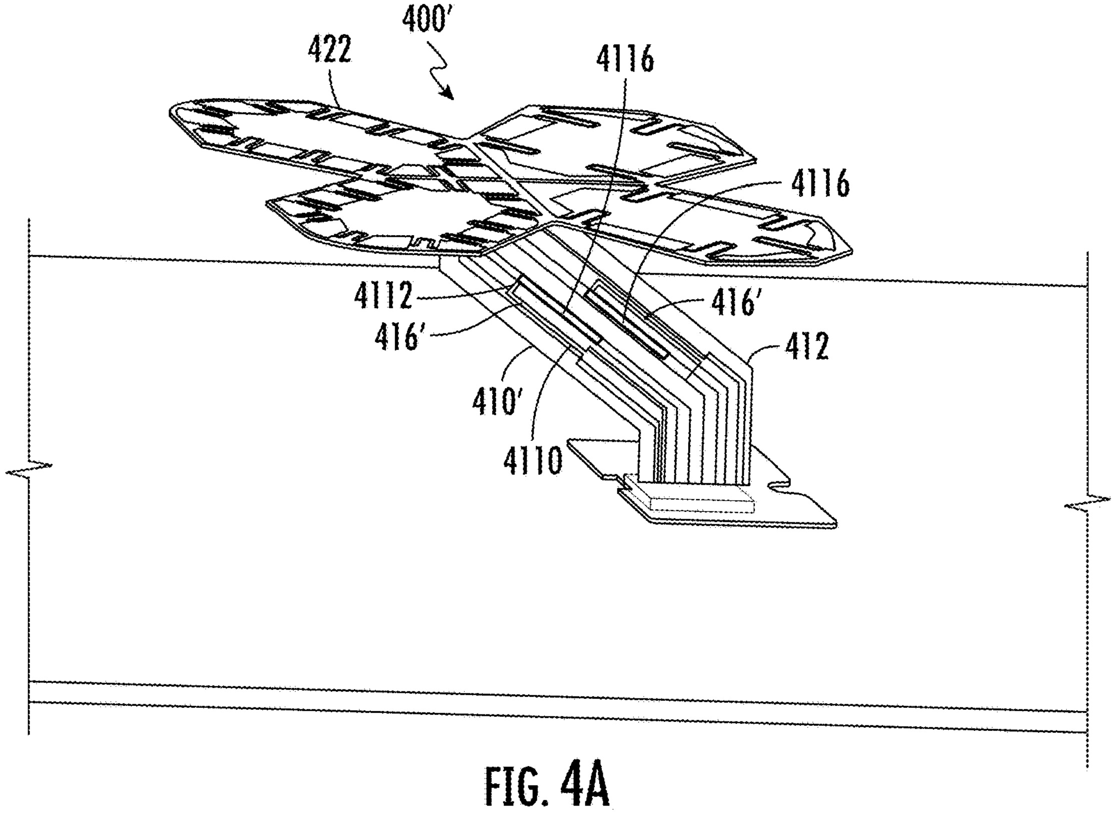
FIG. 4A is a shadow side perspective view of a tilt-stalk low-band radiating element according to further embodiments of the present invention that includes a single feed stalk printed circuit board.
Figure 4B:
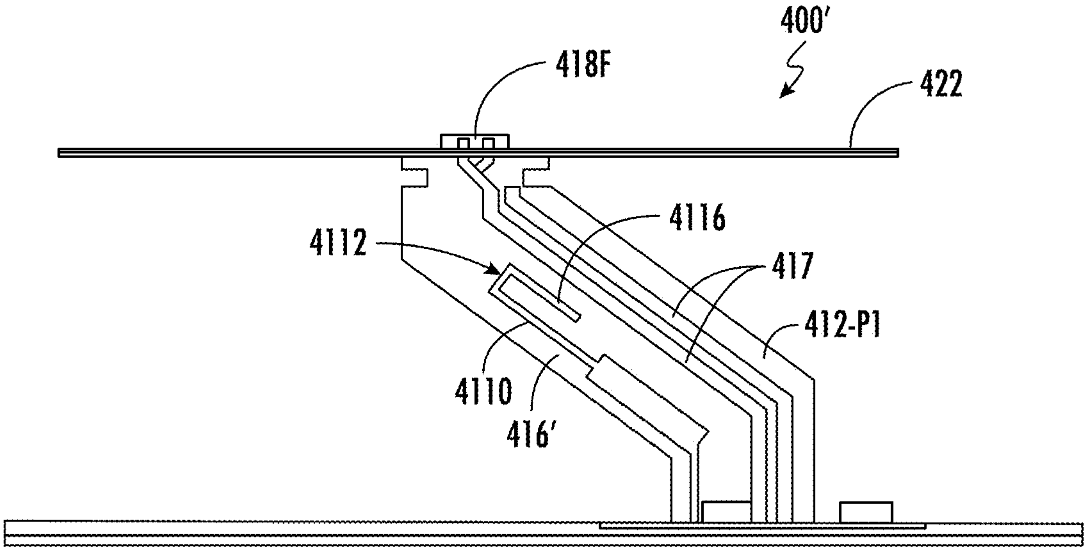
FIGS. 4B and 4C are left and right-side views, respectively, of the low-band radiating element of FIG. 4A.
Figure 4C:
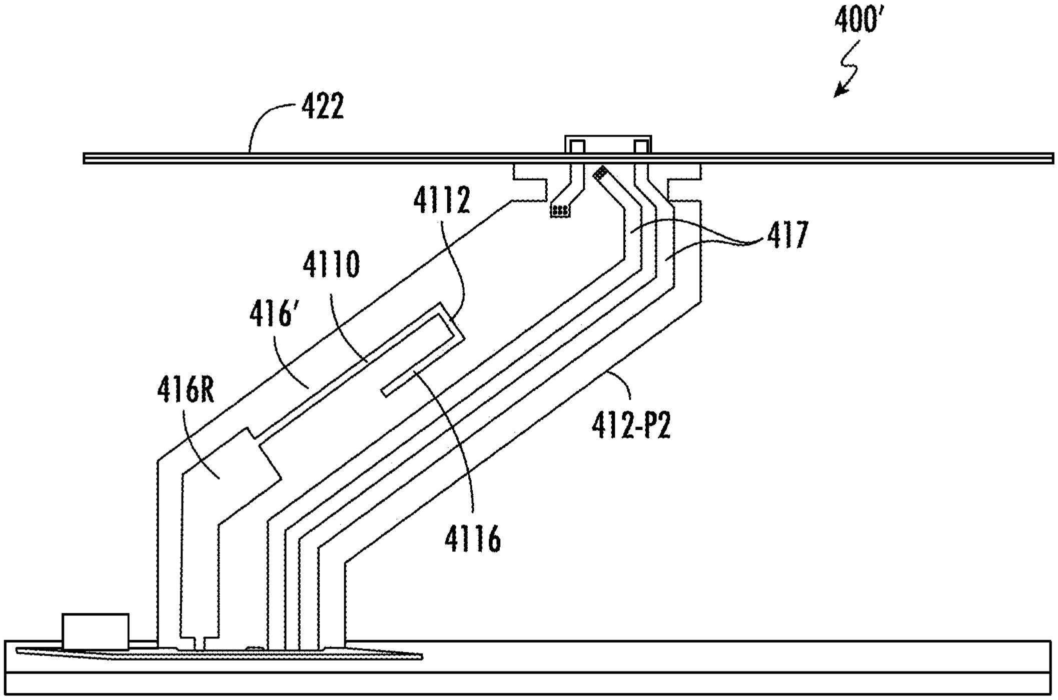

FIGS. 4A-4C illustrate another dual polarized radiating element 400' with an alternate feed stalk 410' that has feed traces 416' with a hook-shape and no plated through hole 419 is required. FIG. 4A is provided in a partially transparent view to show the two pairs of ground lines 417 and respective feed traces 416', which are on different primary surfaces 412-P1, 412-P2 as shown in FIGS. 4B, 4C. Each hook-shaped feed trace 416' includes first and second longitudinally extending portions 4110, 4116 that are connected by a connecting portion 4112. The first longitudinally extending portion 4110 overlaps one ground line of a corresponding pair of ground lines 417 and the second longitudinally extending portion 4116 overlaps a second ground line of the corresponding pair of ground lines 417.

Referring to FIGS. 5A-5D, a dual polarized radiating element 500 is shown. The radiating element 500 can be used to implement the low band radiating element 222, 222' of a base station antenna 100 (FIGS. 1A, 1B, 1D) as discussed above. The radiating element 500 includes a feed stalk 510 that comprises a pair of feed stalk printed circuit boards 512-1, 512-2, and first and second dipole radiators 520-1, 520-2. The first dipole radiator 520-1 extends along a first axis and the second dipole radiator 520-2 extends along a second axis that is generally perpendicular to the first axis. Consequently, the first and second dipole radiators 520-1, 520-2 are arranged in the general shape of a cross. The first dipole radiator 520-1 includes first and second dipole arms 530-1, 530-2, and the second dipole radiator 520-2 includes third and fourth dipole arms 530-3, 530-4. The first and second dipole radiators 520-1, 520-2 are formed on a dipole radiator printed circuit board 522 in the depicted embodiment.

Each feed stalk printed circuit board 512-1, 512-2 may have a respective RF transmission line 514 formed thereon. Each RF transmission line 514 is designed to pass RF signals between a feed board 515 (FIG. 5A) and a respective one of the dipole radiators 520. Each RF transmission line 514 may comprise a hook-shaped feed trace 516. The two-feed stalk printed circuit boards 512-1, 512-2 face each other and are parallel/substantially parallel over at least a major portion of their length. The have opposing primary surfaces 512-P1, 512-P2. The two-feed stalk printed circuit boards 512-1, 512-2 each include a respective transmission line 514-1, 514-2. Each transmission line 514 can include a feed trace 516 on one primary surface, shown as the outer facing primary surface, and at least one ground line 517 on the opposing primary surface, shown as the inner facing surface 512*i*. Thus, the ground line 517 of each transmission line 514-1, 514-2 can face each other, closely spaced apart.

Rearward portions 512R of each feed stalk printed circuit board 512 may include projections 518R that are inserted through slits in the feed board 515 to mount the feed stalk 510 thereon. Forward portions of each feed stalk printed circuit board 512 may include projections 518F that are inserted through slits the dipole radiator printed circuit board 522.

Dipole arms 530-1 and 530-2 of first dipole radiator 520-1 are center fed by a first of the RF transmission lines 514 and radiate together at a first polarization. In the depicted embodiment, the first dipole radiator 520-1 is designed to transmit signals having a slant +45° linear polarization. Dipole arms 530-3 and 530-4 of second dipole radiator 520-2 are center fed by the second of the RF transmission lines 514 and radiate together at a second polarization that is orthogonal to the first polarization. The second dipole radiator 520-2 is designed to transmit signals having a slant −45° linear polarization. Again, the radiating element 500 is thus referred to as a "cross-dipole" radiating element.

The first and second feed stalk printed circuit boards 512-1, 512-2 can be spaced apart by less than $1/20^{th}$ of a wavelength corresponding to a center frequency of an operating frequency band of the dual polarized radiating element 500.

The first through fourth dipole arms 530-1, 530-2, 530-3, 530-4 can be formed in respective first through fourth quadrants of a dipole radiator printed circuit board 522. Electrical connections between the feed stalk printed circuit board 512-1 and the first and third dipole arms 530-1, 530-3 can be in the respective first and third quadrants, respectively, while electrical connections between the feed stalk printed circuit board 512-2 and the second and fourth dipole arms 530-2, 530-4 are in the respective fourth and second quadrants, respectively.

Figure 3G:
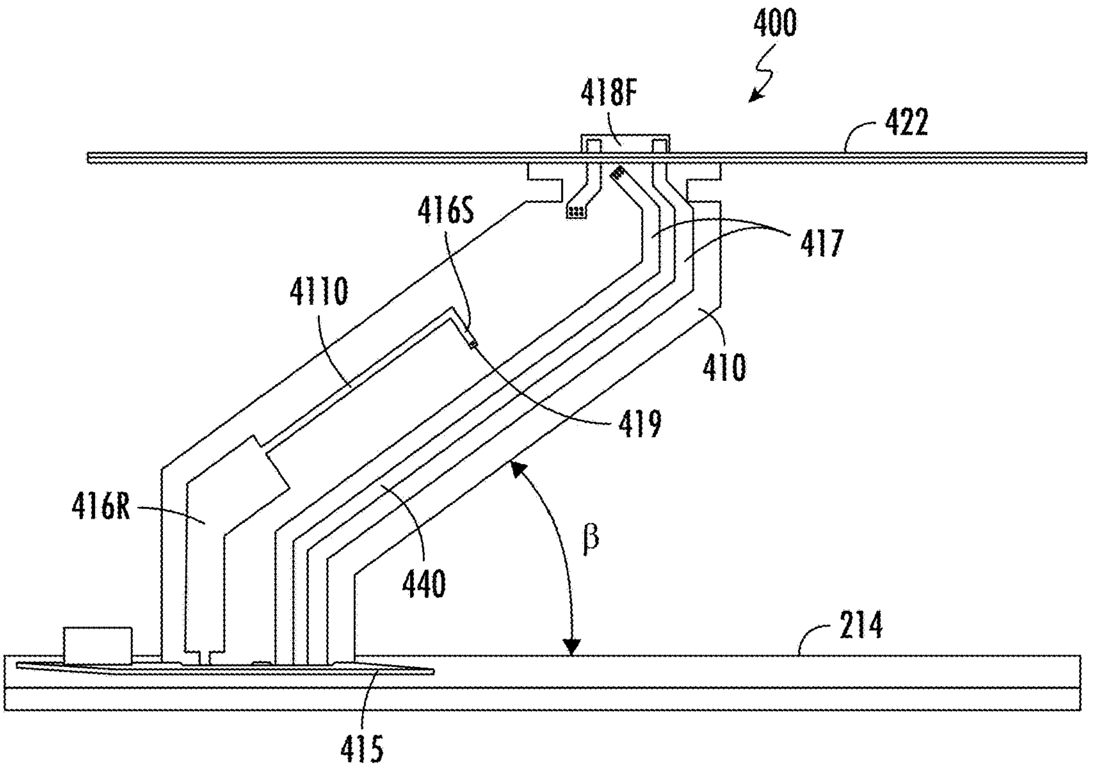

As discussed with respect to FIG. 3G, the first and second feed stalk printed circuit boards 512 can each have a body 512B with a first end portion configured to reside adjacent a reflector 214 and/or feed board 515 and an opposing second (distal) end portion 512F that is adjacent the first and second dipole radiators 530. The body 512B can have an angle of inclination between the first and second end portions 512R, 512F, respectively, that is between 20 and 75 degrees.

The first end portion 512R and the second end portion 512F can be perpendicular to a plane defined by a primary surface of the printed circuit board 522 providing the first and second dipole radiators 530.

Four projecting tabs 518F can provide solder joints 555 to galvanically couple to the dipole arms 530. The solder joints 555 can comprise solder pads on the feed stalk printed circuit boards 512-1, 512-2, with two solder pads on each feed stalk printed circuit board 512 thereby providing four solder joints 5551-5554.

Figure 5A:
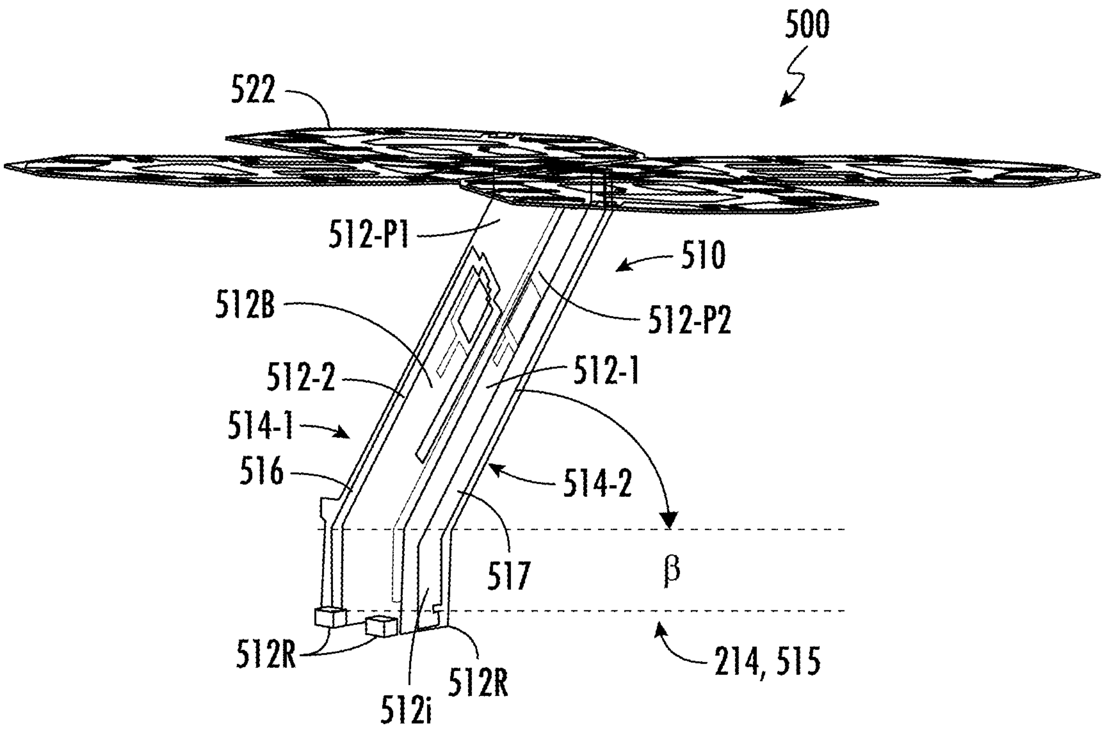
FIGS. 5A-5B are right and left side schematic perspective views, respectively, of a tilt stalk low-band radiating element according to embodiments of the present invention that includes two parallel feed stalk printed circuit boards.
Figure 5B:
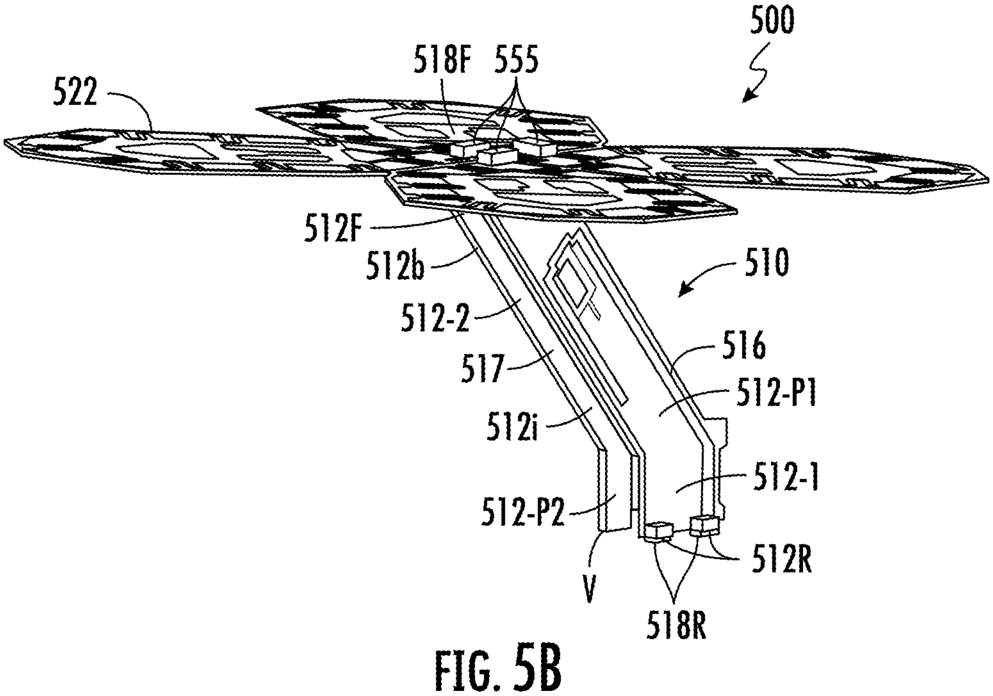
Figure 5C:
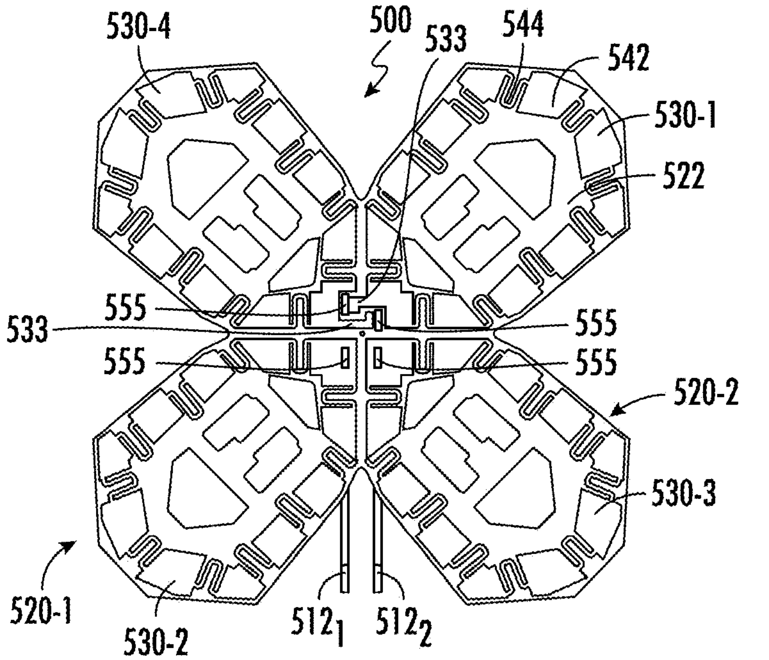
FIG. 5C is a front view of the low-band radiating element of FIGS. 5A-5B.
Figure 5D:
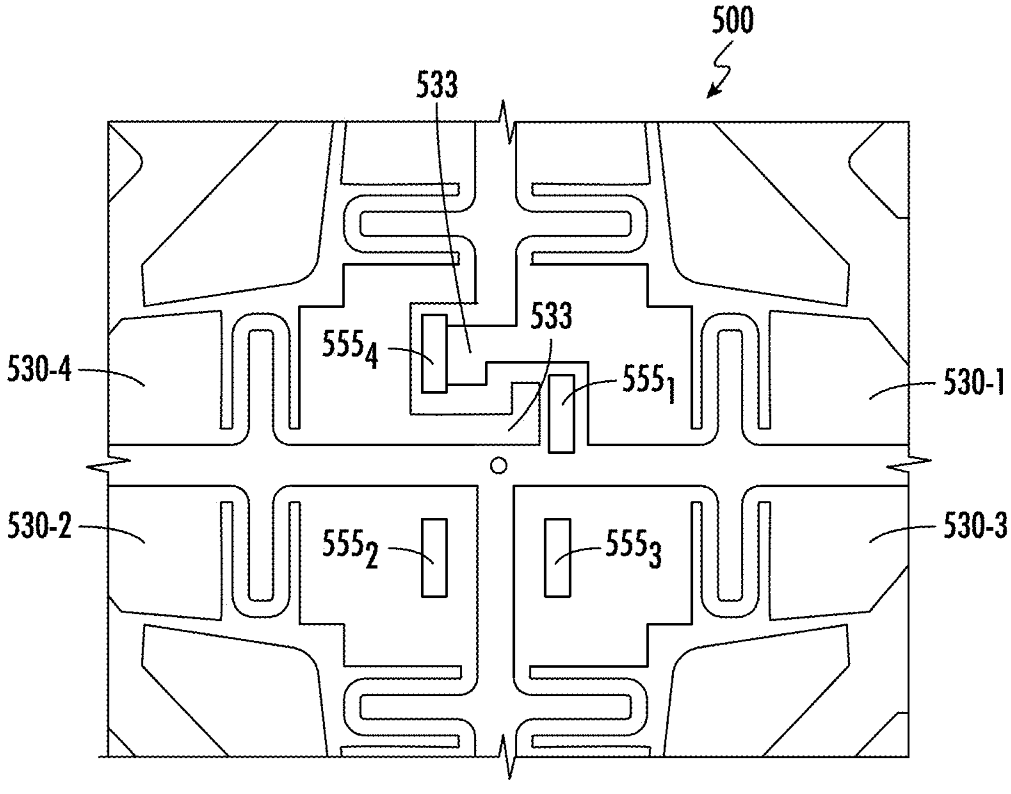
FIG. 5D is a greatly enlarged front view of the connection between the feed stalk printed circuit board and the dipole radiator printed circuit board of the low-band radiating element of FIGS. 5A-5B.

Referring to FIGS. 5C and 5D, two dipole arms 530, shown as dipole arm 530-1 and dipole arm 530-4 can have an extension segment 533 that extends across a portion of the other dipole arm 530-1, 530-4 to a respective solder joint 555. The extension segment 533 can have a wider end segment adjacent the respective solder joint 555, relative to the connecting bridge between the corresponding metal pattern 542 and the wider end segment.

As shown in FIG. 5C, each dipole arm 530 may comprise a shaped metal pattern on the dielectric substrate of the dipole radiator printed circuit board 522. The metal pattern forming each dipole arm 530 includes a plurality of widened sections 542 that are connected by narrowed trace sections 544. This design allows the dipole arms 530 to act as "cloaking" dipole arms that have reduced impact on the antenna beams generated by closely located radiating elements that transmit and receive signals in other frequency bands (i.e., reduced scattering). This ensures that the radiating element 500 will not substantially impact the radiation pattern of other radiating elements of antenna 100 that are mounted near radiating element 500. Dipole arms 530-1 and 530-3 may be located near (e.g., directly in front of) mid-band radiating elements 232 of antenna 100, and hence have metal patterns that are designed to be substantially transparent to RF energy in the mid-band operating frequency band. Dipole arms 530-2 and 530-4 may be located near (e.g., directly in front of) high-band radiating elements 242 of antenna 100, and hence have metal patterns that are designed to be substantially transparent to RF energy in the high-band operating frequency band.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Herein, the term "substantially" means within +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A dual polarized radiating element comprising: a first dipole radiator having a first dipole arm and a second dipole arm; a second dipole radiator having a third dipole arm and a fourth dipole arm; and a feed stalk printed circuit board that is configured to electrically connect the first dipole radiator and the second dipole radiator to a feed network, wherein the feed stalk printed circuit board comprises a first end portion and an opposing second end portion that is in front of the first end portion, and a first primary surface and a second primary surface opposite the first primary surface, the feed stalk printed circuit board comprising, a first feed line that is configured to feed first radio frequency ("RF") signals to the first dipole radiator, the first feed line comprising only a single first feed trace that resides entirely on the first primary surface for at least a major portion of a distance between the first end portion and the second end portion and a first pair of ground lines that reside entirely on the second primary surface for at least the major portion of the distance between the first end portion and the second end portion; and a second feed line that is configured to feed second RF signals to the second dipole radiator, the second feed line comprising a single second feed trace that resides entirely on the second primary surface for at least the major portion of the distance between the first end portion and the second end portion and a second pair of ground lines that reside entirely on the first primary surface for at least the major portion of the distance between the first end portion and the second end portion.

2. The dual polarized radiating element of claim 1, wherein the first feed trace comprises a hook shape signal trace segment that includes a first longitudinally extending portion and a second longitudinally extending portion that are connected by a connecting portion, all on the first primary surface, wherein the first longitudinally extending portion on the first primary surface overlaps a first one of the first pair of ground lines on the second primary surface and the second longitudinally extending portion on the first primary surface overlaps a second one of the first pair of ground lines on the second primary surface.

3. The dual polarized radiating element of claim 1, wherein the first feed trace comprises a first segment on the first primary surface that extends longitudinally and overlaps a first one of the first pair of ground lines on the second primary surface and that merges into a second segment on the first primary surface that extends across a gap that extends between the first pair of ground lines on the second primary surface.

4. The dual polarized radiating element of claim 3, wherein the second segment extends to a plated through hole and electrically connects to a ground plane provided by one or more ground lines of the first pair of ground lines on the second primary surface.

5. The dual polarized radiating element of claim 1, wherein the second end portion comprises a forward end portion of the feed stalk printed circuit board that is adjacent the first dipole radiator and the second dipole radiator, wherein a first one of the ground lines of the first pair of ground lines crosses over to the first primary surface of the feed stalk printed circuit board and extends forward as a ground trace segment along the forward end portion to connect to the first dipole arm, while a second ground line of the first pair of ground lines at the forward end portion of the feed stalk printed circuit board extends forward along the forward end portion on the second primary surface and connects to the second dipole arm.

6. The dual polarized radiating element of claim 5, wherein the forward end portion of the feed stalk printed circuit board comprises a plated through hole that provides an electrical path for the first one of the ground lines of the first pair of ground lines from the second primary surface to the first primary surface.

7. The dual polarized radiating element of claim 1, wherein the feed stalk printed circuit board is a single feed stalk printed circuit board and the dual polarized radiating element is entirely supported by the single feed stalk printed circuit board and is devoid of any metal support structure, and wherein the dual polarized radiating element further comprises a first solder pad, a second solder pad, a third solder pad, and a fourth solder pad that couple the first pair of ground lines and the second pair of ground lines to corresponding ones of the first dipole arm, the second dipole arm, the third dipole arm and the fourth dipole arm.

8. The dual polarized radiating element of claim 1, wherein a first ground line of the second pair of ground lines crosses over a first ground line of the first pair of ground lines.

9. The dual polarized radiating element of claim 8, wherein at least half of a length of the first ground line of the first pair of ground lines is positioned between a second ground line of the first pair of ground lines and the first ground line of the second pair of ground lines.

10. The dual polarized radiating element of claim 1, wherein the first dipole radiator and the second dipole radiator comprise a dipole radiator printed circuit board having a first side and a second side positioned on opposing sides of the feed stalk printed circuit board, wherein the feed stalk printed circuit board comprises a front end portion that extends forward of the dipole radiator printed circuit board, wherein a first ground line of each of the first pair of ground lines and the second pair of ground lines are positioned on the first primary surface of the feed stalk printed circuit board at the front end portion and a second ground line of each of the first pair of ground lines and the second pair of ground lines are positioned on the second primary surface of the feed stalk printed circuit board at the front end portion, wherein a segment of the first ground line of the first pair of ground lines crosses over from the second primary surface to the first primary surface adjacent the dipole radiator printed circuit board, wherein a segment of the second ground line of the second pair of ground lines crosses over to the second primary surface adjacent the dipole radiator printed circuit board, and wherein the first ground line of the first pair of ground lines electrically connects to the first dipole arm on the first side of the dipole radiator printed circuit board and the second ground line of the first pair of ground lines electrically connects to the second dipole arm on the second side of the dipole radiator printed circuit board.

11. The dual polarized radiating element of claim 1, wherein the first feed trace is connected to a center conductor of an RF transmission line, and wherein the first pair of ground lines is connected to a ground conductor of the RF transmission line.

12. The dual polarized radiating element of claim 1, wherein the feed stalk printed circuit board has a body providing the first end portion and the second end portion, wherein the first end portion is configured to reside adjacent a reflector, and the second end portion is adjacent the first dipole radiator and the second dipole radiator with the second end portion projecting forward of the first dipole radiator and the second dipole radiator and defining contact surfaces to connect the first dipole radiator with the second end portion of the feed stalk printed circuit board and to connect the second dipole radiator with the second end portion of the feed stalk printed circuit board, and wherein the body has an angle of inclination between the first end portion and the second end portion that is between 20 and 75 degrees.

13. The dual polarized radiating element of claim 1, wherein the feed stalk printed circuit board has a body with a first body segment defining the first end portion, wherein the first end portion is configured to reside adjacent a reflector, wherein the first body segment merges into a second body segment that is in front of the first body segment and the second body segment angles laterally relative to the first body segment, wherein the body of the feed stalk printed circuit board has a third body segment that is forward of the second body segment and that is perpendicular to the dipole radiator printed circuit board providing the first dipole radiator and the second dipole radiator, wherein the first feed trace has a first trace segment and a second trace segment, wherein the first trace segment is wider than the second trace segment, wherein the second trace segment is closer to the first dipole radiator and the second dipole radiator than the first trace segment, and wherein the first trace segment overlaps the first pair of ground lines at a position below the third body segment of the body of the feed stalk printed circuit board.

14. A base station antenna comprising a plurality of the dual polarized radiating elements of claim 1, wherein the plurality of the dual polarized radiating elements reside only along right and left side portions of the base station antenna.

15. A dual polarized radiating element comprising: a feed stalk printed circuit board that has a first primary surface and a second primary surface that is opposed to the first primary surface, the second primary surface having a first pair of ground lines thereon, wherein a first ground line of the first pair of ground lines connects to a first solder pad that is on the second primary surface and a second ground line of the first pair of ground lines connects to a second solder pad that is on the first primary surface; a first dipole radiator having a first dipole arm and a second dipole arm; and a second dipole radiator having a third dipole arm and a fourth dipole arm, wherein the first dipole radiator and the second dipole radiator are mounted on a distal end of the feed stalk printed circuit board, wherein the first pair of ground lines comprises part of a first feed line that is configured to feed first radio frequency ("RF") signals to the first dipole radiator, the first feed line further comprising a first feed trace that is on the first primary surface, wherein the dual polarized radiating element further comprises a second pair of ground lines that comprises part of a second feed line that is configured to feed second RF signals to the second dipole radiator, the second feed line further comprising a second feed trace that is on the second primary surface, wherein the first feed trace resides entirely on the first primary surface for at least a major portion of a distance between the distal end of the feed stalk printed circuit board and an opposing proximal end of the feed stalk printed circuit board with the proximal end positioned behind the distal end, wherein the first pair of ground lines reside entirely on the second primary surface for at least the major portion of the distance between the distal end and the opposing proximal end, and wherein the second feed trace resides entirely on the second primary surface for at least the major portion of the distance between the distal end of the feed stalk printed circuit board and the opposing proximal end, wherein the second pair of ground lines reside entirely on the first primary surface for at least the major portion of the distance between the distal end and the opposing proximal end.

16. The dual polarized radiating element of claim 15, wherein a first ground line of the second pair of ground lines connects to a third solder pad that is on the first primary surface and a second ground line of the second pair of ground lines connects to a fourth solder pad that is on the second primary surface.

17. The dual polarized radiating element of claim 16, wherein the first dipole radiator and the second dipole radiator are formed in a dipole radiator printed circuit board, and wherein the distal end of the feed stalk printed circuit board includes a protruding tab that extends through the dipole radiator printed circuit board, and the first solder pad, the second solder pad, the third solder pad, and the fourth solder pad are arranged in a substantially straight line with two of the first solder pad, the second solder pad, the third solder pad and the fourth solder pad on the first primary surface at the protruding tab and two other of the first solder pad, the second solder pad, the third solder pad and the fourth solder pad on the second primary surface at the protruding tab.

18. The dual polarized radiating element of claim 16, wherein the first ground line of the second pair of ground lines crosses over the first ground line of the first pair of ground lines at a forward end portion of the feed stalk printed circuit board at a position that is adjacent the first dipole radiator and the second dipole radiator.

19. The dual polarized radiating element of claim 18, wherein at least half of a length of the first ground line of the first pair of ground lines is positioned between the second ground line of the first pair of ground lines and the first ground line of the second pair of ground lines.

20. The dual polarized radiating element of claim 15, wherein the first feed trace comprises a hook shape signal trace segment that includes a first longitudinally extending portion and a second longitudinally extending portion that are connected by a connecting portion, wherein the first longitudinally extending portion overlaps the first ground line of the first pair of ground lines and the second longitudinally extending portion overlaps the second ground line of the first pair of ground lines, and wherein the first and second ground lines of the first pair of ground lines are positioned adjacent to each other, and wherein the first and second ground lines of the first pair of ground lines have a length and have a substantially common width over at least a major portion of the length.

21. The dual polarized radiating element of claim 15, wherein the first feed trace comprises a first segment that extends longitudinally and overlaps the first ground line of the first pair of ground lines and that merges into a second segment that extends across a gap that extends between the first pair of ground lines, and wherein the first and second ground lines of the first pair of ground lines have a respective length and are positioned adjacent to each other and have a substantially common width over at least a major portion of the respective length.

22. A dual polarized radiating element comprising: a dipole radiator printed circuit board comprising: a first dipole radiator having a first dipole arm and a second dipole arm; a second dipole radiator having a third dipole arm and a fourth dipole arm; and first and second feed stalk printed circuit boards that are parallel or substantially parallel over at least a major portion of their length and arranged with primary surfaces that face each other, wherein the first and second feed stalk printed circuit boards each have a body with a rearward end portion and a forward end portion, wherein the rearward end portion has a length and the forward end portion has a length and are perpendicular to the dipole radiator printed circuit board, and wherein the body of each of the first and second feed stalk printed circuit boards have a segment between the rearward end portion and the forward end portion that angles over a length that is greater than the length of the forward end portion and greater than the length of the rearward end portion, and wherein the angle is in a range of 20-75 degrees.

23. The dual polarized radiating element of claim 22, wherein the first and second feed stalk printed circuit boards are spaced apart by less than $1/20^{th}$ of a wavelength corresponding to a center frequency of an operating frequency band of the dual polarized radiating element.

24. The dual polarized radiating element of claim 22, wherein the rearward end portion of each of the first and second feed stalk printed circuit boards is configured to reside adjacent a reflector and the forward end portion is adjacent to the first dipole radiator and the second dipole radiator with the forward end portion projecting forward of the first dipole radiator and the second dipole radiator, and wherein the first and second feed stalk printed circuit boards are parallel and spaced apart a distance that is less than $1/20^{th}$ of a wavelength corresponding to a center frequency of an operating frequency band of the dual polarized radiating element.

25. The dual polarized radiating element of claim 22, wherein the first and second feed stalk printed circuit boards are self-supporting structures devoid of sheet metal.

* * * * *